Patented Dec. 19, 1939

2,183,847

UNITED STATES PATENT OFFICE 2,183,847

PROCESS OF REACTING ALKALI METALS WITH AROMATIC HYDROCARBONS

Norman D. Scott, Sanborn, N. Y., assignor to E. I. du Pont de Nemours & Company, Wilmington, Del., a corporation of Delaware No Drawing. Original application November 13, 1935, Serial No. 49,556. Divided and this application February 9, 1938, Serial No. 189,670

6 Claims. (Cl. 260—665)

This invention relates to improvements in the method of effecting the reaction of alkali metals with aromatic hydrocarbons. This application is a division of my copending application Ser. No. 49,556, which was filed Nov. 13, 1935, and issued August 2, 1938, as U. S. P. 2,125,401 which was a continuation in part of my co-pending application Ser. No. 638,524 issued Jan. 7, 1936, as U. S. P. 2,027,000.

It is well known that alkali metals will react with a wide variety of aromatic hydracarbons under a wide variety of conditions. An extensive review of this work has recently been published by C. B. Wooster (Chemical Reviews XI, Aug. 1, 1932). While most of the reactions described are at present of little technical significance on account of the cost of the materials involved, there is particular interest in the attempts that have been made to react alkali metals with the cheaper hydrocarbons such as naphthalene and diphenyl. Schlenk (Annalen 463, 90–95) carried out slow reactions using lithium in ethyl ether and obtained sufficient reaction in eight days with naphthalene, and in fourteen days with diphenyl, to permit some examination of the products formed. He represented the alkali metal compounds by the formulae,

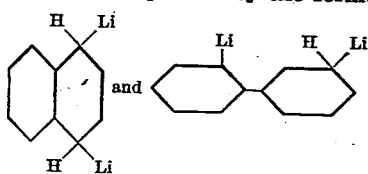

Schlenk, using ethyl ether as solvent, failed to get any appreciable reaction of sodium with these hydrocarbons even in months. He attributed this to a poisoning effect on the sodium of minute traces of sulfur compounds present even in the best grades of naphthalene as supplied for a standard for calorimetry.

The reaction of sodium with naphthalene has also been studied to some extent using liquid ammonia as solvent. At ordinary temperatures, the reaction products are sodamide and tetralin. At low temperatures a red solution is obtained which has been shown by Wooster (J. A. C. S. 53, 179–187 1931), to be in all probability a monosodium tetralin formed by addition of four atoms of sodium to one molecule of naphthalene, followed by immediate amonolysis of three atoms of the sodium to sodamide as represented by the equations:

$$C_{10}H_8 + 4Na \rightarrow C_{10}H_8Na_4$$

$$C_{10}H_8Na_4 + 3NH_3 = 3NaNH_2 + C_{10}H_{11}Na$$

Because of the large consumption of sodium and the reactivity of the ammonia used as solvent, this method is practically useless as a means of preparing acids or other derivatives from naphthalene.

One object of this invention is to improve the rate of known reactions of alkali metals with various classes of aromatic hydrocarbons. Another object is to cause the reactions to be carried out at low or moderate temperatures and conditions favorable to the stability of the products. Another object is to permit the reaction of relatively cheap and available materials to give valuable products not previously obtainable. Other objects will appear from the description of the invention.

I have found that certain solvents and classes of solvents have a very specific action in promoting the reaction of alkali metals with aromatic hydrocarbons such as naphthalene, diphenyl, phenanthrene or anthracene and others which will form addition products with alkali metals. As stated, the action of these solvents is specific, but I do not know whether their action is catalytic, whether the solvent itself takes part in the reaction in some manner, or whether there are some solubility or other physical factors involved. These solvents permit or enhance the reaction of sodium with aromatic hydrocarbons, which reactions either occur exceedingly slowly in other solutions or do not occur at all.

The solvents which I have found of such remarkable activity and usefulness for these reactions are broadly in the class of ethers although all of the ethers are not effective, and of the effective ones, some are better than others. Thus I have used satisfactorily certain monoethers as described and claimed in my co-pending application Ser. No. 638,524 issued Jan 7, 1936, as U. S. P. 2,027,000, and aliphatic polyethers of all types as described in my co-pending application Ser. No. 49,556. By polyethers in this case I means the fully alkylated products of polyhydric alcohols such as the glycols and glycerols and including the ethers from the hypothetical polyhydric alcohols such as methylene glycol or others with more than one hydroxyl group on the same carbon atom, e. g., ethyl ortho formate, methylal or other acetals. Thus I have used successfully methylal; ethylene glycol diethers such as the methyl methyl, methyl ethyl, ethyl ethyl, methyl butyl, ethyl butyl, butyl butyl, butyl lauryl; trimethylene glycol dimethyl ether; glycerol trimethyl ether; glycerol dimethyl ethyl ether; methyl ortho formate; ethyl ortho formate; diethylene glycol methyl ethyl ether; formal of the monomethyl ether of ethylene glycol; and the like. Among the ethers mentioned as solvents in these co-pending applications I have also found especially useful certain cyclic ethers which may be designated as cyclic formals, e. g., glycol formal, methyl glycerol formal and dimethylene pentaerythrite. By way of explanation it should be said that the term "formals" is applied to a series of compounds, the simplest members of which are derived from formaldehyde, in a manner analogous to that in which acetals may be said to be derived from acetaldehyde. Thus from acetaldehyde, or ethanal, having the formula $CH_3CHO$, may be derived the compound "acetal" with the formula $CH_3CH(OC_2H_5)_2$. With this as a basis, the series of compounds having the general formula $CH_3CH(OR)_2$, where R represents an alkyl group, is called "acetals". (Whitmore, Organic Chemistry, p. 233.) In a similar manner, if one starts with formaldehyde, $H_2CO$, this compound may, under proper conditions, pass thru a step in which is formed the hypothetical hydrate of formaldehyde, $H_2C(OH)_2$, to give the final product methylal, or formal, $CH_2(OCH_3)_2$. (Whitmore, Organic Chemistry, p. 225.) By analogy then, the substances having the general formula $CH_2(OR)_2$, where R is an alkyl group, are called "formals". If a glycol, e. g., ethylene glycol, $CH_2OH.CH_2OH$, is reacted with formaldehyde, the final product is a cyclic derivative of the formal series called glycol formal, according to the equation

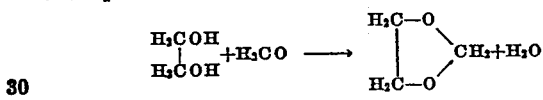

(Whitmore, Organic Chemistry, p. 225.) Other polyhydric alcohols, such as glycerol, will also form cyclic formals, one such being the solvent methyl glycerol formal,

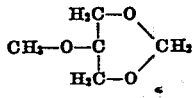

Another solvent is the polycyclic formal of pentaerythritol, having the formula

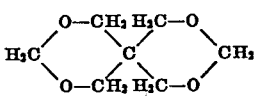

and designated herein as dimethylene pentaerythrite. Dioxan $(OCH_2CH_2)_2$, may also be used in this process as a solvent under certain conditions but of the cyclic ethers I prefer to use solvents of the types represented by those previously mentioned. In the case of the ethers of the polyalcohols such as the glycerols, they may have the O on adjacent C atoms, as in ethylene glycol or 1,2-propylene glycol, or they may be separated as in 1,3-propylene glycol.

The chief requirement of these poly ethers is that they must not react with the alkali metal or the alkali metal addition compounds under the conditions used. I do not mean by this that the ethers may not react in some way in some reversible reaction with the alkali metal and/or naphthalene since indications are that the ethers in effecting the reactions may to some extent take part in the reaction, but the ether must not be broken up or form irreversible reaction products at a rate comparable with the desired reactions. A slight irreversible reaction may take place without a substantial loss. In order to simplify the wording later, I further specify such ethers as are effective within my invention as being "inert", although as noted they may play some active role in causing the reactions to proceed, or may undergo decomposition reactions at rates very slow in comparison with the desired addition reactions.

I have found that inert non-ether types of solvents such as hydrocarbons or alkyl sulfides which do not react with the alkali metals and which in themselves are non-effective for the reactions may be used as diluting agents for the effective aliphatic polyethers. There is, however, a minimum concentration of the effective ether in the non-effective solvents beyond which the reaction will not proceed. Thus, in general the effective dimethyl ethylene glycol ether can be diluted with a non-reactive, non-effective hydrocarbon up to 4 or 5 times its volume. If the dilution be as high as 6 or 8 times the volume of the active ether the reaction will not proceed. With the higher monoethers, which are non-effective or relatively non-effective in themselves, the dilution may be greater.

As noted above, various aromatic hydrocarbons have been tried, and it was found that these effective ethers enhanced the alkali metal reactions. For further description, the invention will be illustrated particularly with respect to the reaction of naphthalene with sodium, but it is to be understood that what is said thereon will apply equally well to the reaction of the other alkali metals and to any of the polycyclic aromatic hydrocarbons capable of forming addition compounds with alkali metal. Examples of polycyclic aromatic hydrocarbons other than naphthalene which may be reacted with alkali metal in accordance with the present invention are diphenyl, dinaphthyl, phenanthrene, acenaphthene, anthracene and retene, as well as homologs (e. g., alkyl derivatives) of these hydrocarbons. The various polyethers hereinafter mentioned are effective solvents for the reaction of these hydrocarbons with alkali metals.

I have found that sodium reacts very readily with naphthalene in dimethyl ethylene glycol ether solution even at —70° C. Naphthalene also reacts readily with sodium using methyl ethyl glycol ether as solvent. Other mixed poly ethers with higher primary alkyl groups can also be used, as listed above. Similar results are obtained when other polycyclic aromatic hydrocarbons, e. g., diphenyl, phenanthrene, acenaphthene or anthracene are used in place of naphthalene.

It is to be understood also that this invention includes the use as solvent, not only of the "effective" solvents as defined and illustrated, but also of mixtures of these solvents with other solvents which may include the less active higher monoethers, and also hydrocarbons. Considerably greater dilution with inert solvents is permissible after the reaction is definitely started.

I have further discovered that a solution of naphthalene in an "effective" polyether will readily dissolve sodium in an amount equivalent to one gram atom of sodium for each gram molecule of naphthalene; thereafter the solution of further amounts of sodium becomes so slow as to be negligible. This is somewhat unexpected since the reaction products obtained by further treatment of the sodium-napthalene compound, for example, with water or $CO_2$ indicate that it is in large part the 1:4 disodium naphthalene:

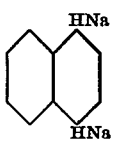

It is probable that this is an equilibrium reaction. It is also found that other isomeric disodium addition compounds are formed as evidenced by the formation of isomeric acids.

In view of the fact that the solution which is thus prepared, and contains one gram atom of sodium for each gram molecule of naphthalene, is a highly colored green solution and readily conducts an electric current, it is possible that the compound may exist in solution as a free radical which may be represented by the formula:

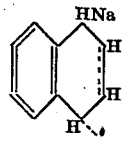

The soluble addition compound may involve the combination of disodium naphthalene with an extra molecule of naphthalene in some other manner. Thus its formula could be written:

without specifying the exact method of combination. Moreover this soluble addition product may conceivably also include some combination with the ether solvent to account for the specific action of the effective aliphatic poly ethers. The reactions of this material, however, are clearly evident and I do not desire to be limited by any hypothesis as to the probable structure in solution.

If such a solution which contains sodium equivalent to one gram atom of sodium for each gram molecule of naphthalene be treated with water or alcohol, it will yield equivalent amounts of naphthalene and dihydronaphthalene; with $CO_2$ it will yield the sodium salts of dihydronaphthalene-dicarboxy acids, along with an equivalent amount of naphthalene. If, however, either the hydrolysis or the carboxylation is carried out gradually while further amounts of sodium are present in the liquid, further amounts of this sodium will dissolve as that in the solution is used by the hydrolysis or carboxylation. In this manner I have been able to react essentially all of the naphthalene and recover the major amount as the dihydronaphthalene or dihydronaphthalene-dicarboxy acids.

As indicated above, I have made this addition of sodium to naphthalene itself and to other polycyclic aromatic hydrocarbons. I have found that in the case of naphthalene itself, the product formed is in large part the 1:4 disodium compound. Formation of this compound is probably permitted by the splitting of the double bonds between the 1:2 and 3:4 positions and the formation of a double bond between the 2:3 positions with the sodium occupying the free linkages thus created. Such a mechanism would permit addition in a similar manner in the case of substituted naphthalene where the 1:4 positions may be occupied by constituent groups since the reaction is not dependent on replacement of hydrogen or substituents by the sodium; there is no hydrogen evolved in the reaction of my invention as far as I have been able to discover.

I have discovered that this sodium naphthalene addition product is a very reactive material. Thus, as indicated above, hydrolysis can be made to take place to form dihydronaphthalene, or the addition product still in the ether solution can be treated with $CO_2$ and converted into sodium salts of dihydronaphthalene-dicarboxylic acids, which can be isolated. The sodium addition products of the other polycyclic aromatic hydrocarbons react in a similar manner. The further reactions of these sodium addition products are not, however, claimed in this application, but are the subject matter of co-pending application Serial No. 49,556 which issued August 2, 1938, as U. S. P. 2,125,401 and applications to be filed at a later date.

In carrying out these reactions, I have found it to be of importance to have the surfaces of the sodium clean. Thus the solvent must be purified of such materials as will react with sodium and tend to form insoluble coatings thereon, under the conditions to be used, and the sodium should be protected from contact with such reactive materials from the time it is mechanically subdivided. Extreme fineness of sodium is not required although the rate will be dependent, among other things, on the extent of sodium surface, and this affords one means of controlling the rate. The naphthalene need not be of extreme purity. Technical flake naphthalene works quite satisfactorily. The complete absence of all sulfur compounds is not essential as shown by the fact that dimethyl sulfide can be used as an inert diluent solvent in the effective reaction medium for the reaction of sodium with naphthalene. The presence of free $CO_2$ dissolved in the solvent is likely to interfere with the reaction of sodium with naphthalene starting because of coating the sodium.

On the other hand, when the reaction is well started, dry $CO_2$ can then be introduced and the carboxylation carried on simultaneously as long as care is taken that the rate is insufficient to destroy completely all the green color of the sodium naphthalene compound, which will continue to be formed by the reaction of additional sodium. In this way the preparation of the sodium salts of the dicarboxy acids can be carried out simultaneously in a single vessel. In order to insure complete freedom from metallic sodium in the product, however, it is better to filter the green solution of the sodium naphthalene away from the unreacted sodium and treat it with $CO_2$ in a separate vessel. This precipitates the sodium salts which can be filtered out and the solvent, together with the unreacted naphthalene and a small amount of the sodium naphthalene compound returned to the first vessel. Such a process can be operated either as a batch process or continuously.

The allowable concentration of naphthalene or other polycyclic aromatic hydrocarbon is limited only by its solubility. The reaction temperature can vary from at least $-80°$ C. to above the melting point of sodium, limited only by the stability of the combination of materials used and that of the product. The reactions in general are fast up to the solution of one gram atom of sodium per gram molecule of naphthalene in solution. In these reactions, both in the prior reaction with sodium and in the carboxylation, obviously pressures above atmospheric may be used if desired or necessary to confine the solvents at the temperatures found optimum for the reaction.

The following examples are given by way of further illustration:

*Example I*

11.6 gms. sodium and 39 gms. naphthalene were added to 375 cc. glycol formal. The reaction started immediately. After fifteen minutes agitation, a slow stream of $CO_2$ was introduced while the agitation was continued; this stream of $CO_2$ was maintained at such rate that the green color of the solution was not completely discharged until the sodium had essentially all dissolved or reacted. Toward the end of two hours, the carboxylation was allowed to go to completion; the green color was completely discharged and in the vessel was a white slurry of sodium salts of dihydronaphthalene-dicarboxylic acids. On treatment of the salts with aqueous HCl and repeated extraction with ether, a high yield of a mixture of the isomeric dibasic acids was isolated.

*Example II*

25 grams of dimethylene pentaerythrite were placed in a test tube and heated at 50°–55° C. until the compound was melted. To this were added 6 grams of naphthalene and then 1 gram of sodium in the form of thin chips. The mixture was agitated using a stirring rod so as to rub the sodium surface vigorously. The characteristic green color of sodium naphthalene appears at once and spreads thru the solution. After standing at 50°–55° C. for about 1½ hours with occasional stirring, the sodium dissolved and a strong solution of sodium naphthalene was obtained. A nitrogen atmosphere was maintained over the liquid in the tube.

*Example III*

To about 25 grams of methyl glycerol formal at 10°–20° C. were added 6 grams of naphthalene. One gram of sodium in the form of chips was introduced and the mixture stirred with a rod so as to rub the sodium surface vigorously. The solution takes on the green color characteristic of sodium naphthalene. After standing at 10°–20° C. for about 1½ hours with occasional stirring the sodium dissolved and a strong solution of sodium naphthalene was obtained. A nitrogen atmosphere was maintained over the liquid in the tube at all times.

I claim:

1. A method of effecting the addition of an alkali metal to a polycyclic aromatic hydrocarbon which will form addition compounds therewith, said hydrocarbon being selected from the group consisting of anthracene, dinaphthyl, acenaphthene, retene and their homologues which comprises reacting the alkali metal and the hydrocarbon in a reaction medium which contains in sufficient amount to promote the reaction a polyether selected from the group consisting of glycol formal, methyl glycerol formal, and dimethylene pentaerythrite.

2. A method according to claim 1 which comprises effecting the addition of sodium to the polycyclic aromatic hydrocarbon.

3. A method of effecting the addition of an alkali metal to dinaphthyl which comprises reacting said metal with dinaphthyl in a reaction medium comprising a polyether selected from the group consisting of glycol formal, methyl glycerol formal and dimethylene pentaerythrite in an amount sufficient to promote the reaction.

4. A method of effecting the addition of an alkali metal to acenaphthene which comprises reacting said metal with acenaphthene in a reaction medium comprising a polyether selected from the group consisting of glycol formal, methyl glycerol formal and dimethylene pentaerythrite in an amount sufficient to promote the reaction.

5. A method of effecting the addition of sodium to dinaphthyl which comprises reacting sodium with dinaphthyl in a reaction medium comprising glycol formal in an amount sufficient to promote the reaction.

6. A method of effecting the addition of sodium to anthracene which comprises reacting the sodium and the anthracene in a reaction medium comprising a polyether selected from the group consisting of glycol formal, methyl glycerol formal and dimethylene pentaerythrite in an amount sufficient to promote the reaction.

NORMAN D. SCOTT.